United States Patent
Wang et al.

(10) Patent No.: US 8,415,927 B2
(45) Date of Patent: Apr. 9, 2013

(54) SWITCH EMBEDDED INTEGRATED CIRCUIT AND METHOD FOR BATTERY PROTECTION

(75) Inventors: Chin-Hui Wang, Taipei County (TW); Zheng-Lin Pu, Shanghai (CN); Ying-Jie Han, Shanghai (CN); Hui Wang, Jiangxi Province (CN)

(73) Assignee: Richpower Microelectrics Corporation, Grand Cayman (KY)

( * ) Notice: Subject to any disclaimer, the term of this patent is extended or adjusted under 35 U.S.C. 154(b) by 220 days.

(21) Appl. No.: 12/978,734

(22) Filed: Dec. 27, 2010

(65) Prior Publication Data
US 2011/0169456 A1    Jul. 14, 2011

(30) Foreign Application Priority Data
Jan. 11, 2010  (CN) .......................... 2010 1 0000524

(51) Int. Cl.
*H02J 7/00*         (2006.01)
(52) U.S. Cl. ....................................... 320/134; 320/136
(58) Field of Classification Search .................. None
See application file for complete search history.

(56) References Cited

U.S. PATENT DOCUMENTS

| | | | | |
|---|---|---|---|---|
| 5,547,775 A * | 8/1996 | Eguchi et al. | ................ | 320/118 |
| 5,554,919 A * | 9/1996 | Uchida | ................ | 320/132 |
| 5,581,170 A * | 12/1996 | Mammano et al. | ......... | 320/116 |
| 6,992,463 B2 * | 1/2006 | Yoshio | ................ | 320/134 |
| 7,324,315 B2 * | 1/2008 | Harris | ................ | 361/58 |

* cited by examiner

*Primary Examiner* — Drew A Dunn
*Assistant Examiner* — Robert Grant
(74) *Attorney, Agent, or Firm* — Muncy, Geissler, Olds & Lowe, PLLC

(57) ABSTRACT

A switch embedded integrated circuit for battery protection includes a MOSFET having a body diode, and a control logic circuit for switching the MOSFET and the direction of the body diode to control the charge current to and the discharge current from a battery. The control logic circuit turns off the MOSFET once any abnormal operation such as over-voltage and under-voltage happens, and turns on the MOSFET according to an OVPR threshold, an OVPR delay time, an UVPR threshold and an UVPR delay time. The OVPR threshold and the OVPR delay time are determined depending on the battery being coupled to a load or a charger, or floating.

14 Claims, 13 Drawing Sheets

SWITCH EMBEDDED INTEGRATED CIRCUIT AND METHOD FOR BATTERY PROTECTION

FIELD OF THE INVENTION

The present invention is related to a battery protection circuit and method.

BACKGROUND OF THE INVENTION

A battery-based power supply typically includes a protection circuit for detecting battery conditions, so as to prevent dangerous operations such as over-voltage and under-voltage during charging or discharging of the battery. Conventionally, as shown in FIG. 1, a battery package 10 for portable electronic devices includes a battery 12 and a protection circuit 13. In the protection circuit 13, MOSFETs M1 and M2 have body diodes D1 and D2, respectively, which are arranged in a back-to-back manner, and a detector 14 monitors the voltage of the battery 12 to switch the MOSFETs M1 and M2 accordingly, for controlling the currents going in to and coming out from the battery package 10. During charging operation, a charger 18 provides a charge current to charge the battery 12; during discharging operation, the battery 12 provides a discharge current to a load 16.

Under normal operation, both the MOSFETs M1 and M2 are on to allow the charge current or the discharge current to pass therethrough. Since the MOSFETs M1 and M2 have small voltage drops thereacross, neither of the body diodes D1 and D2 is conductive. However, when the detector 14 detects that an over-voltage event happens to the battery 12, the MOSFET M1 will be turned off while the MOSFET M2 will be turned on, so that the body diode D1 blocks the charge current and only the discharge current is allowed to pass through. On the other hand, when the detector 14 detects that an under-voltage event happens to the battery 12, the MOSFET M1 will be turned on while the MOSFET M2 will be turned off, so that the body diode D2 blocks the discharge current and only the charge current is allowed to pass through.

However, the conventional protection circuit 13 requires two MOSFETs M1 and M2, thereby requiring more costs and die area. Moreover, when the discharge current or the charge current flows through the body diode D1 or D2, it will produce a voltage drop across the body diode D1 or D2 and cause unnecessary power dissipation and heat generation.

SUMMARY OF THE INVENTION

An object of the present invention is to provide a switch embedded integrated circuit and method for battery protection.

According to the present invention, a switch embedded integrated circuit for battery protection includes a MOSFET having a body diode, and a control logic circuit to switch the MOSFET and the direction of the body diode to control a charge current and a discharge current. When a first detector detects an over-voltage or under-voltage event, it signals the control logic circuit to turn off the MOSFET. Depending on whether the battery is coupled to a load or to a charger or floating, a second detector signals the control logic circuit to select an over-voltage-protection-release (OVPR) threshold and an OVPR delay time.

According to the present invention, a method for battery protection includes arranging a MOSFET on a charge and discharge path. The MOSFET has a body diode. During an over-voltage or under-voltage event, the MOSFET is turned off and the direction of the body diode is switched, in order to control a charge current and a discharge current. Depending on whether the battery is coupled to a load or to a charger or floating, an OVPR threshold and an OVPR delay time are selected.

According to the present invention, a switch embedded integrated circuit for battery protection includes a substrate of a first conductive type, an isolation of a second conductive type on the substrate, a well of the first conductive type in the isolation, a MOSFET on the well, and a current optimization circuit coupled to the isolation to apply a voltage to the isolation for preventing the MOSFET being latched up.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
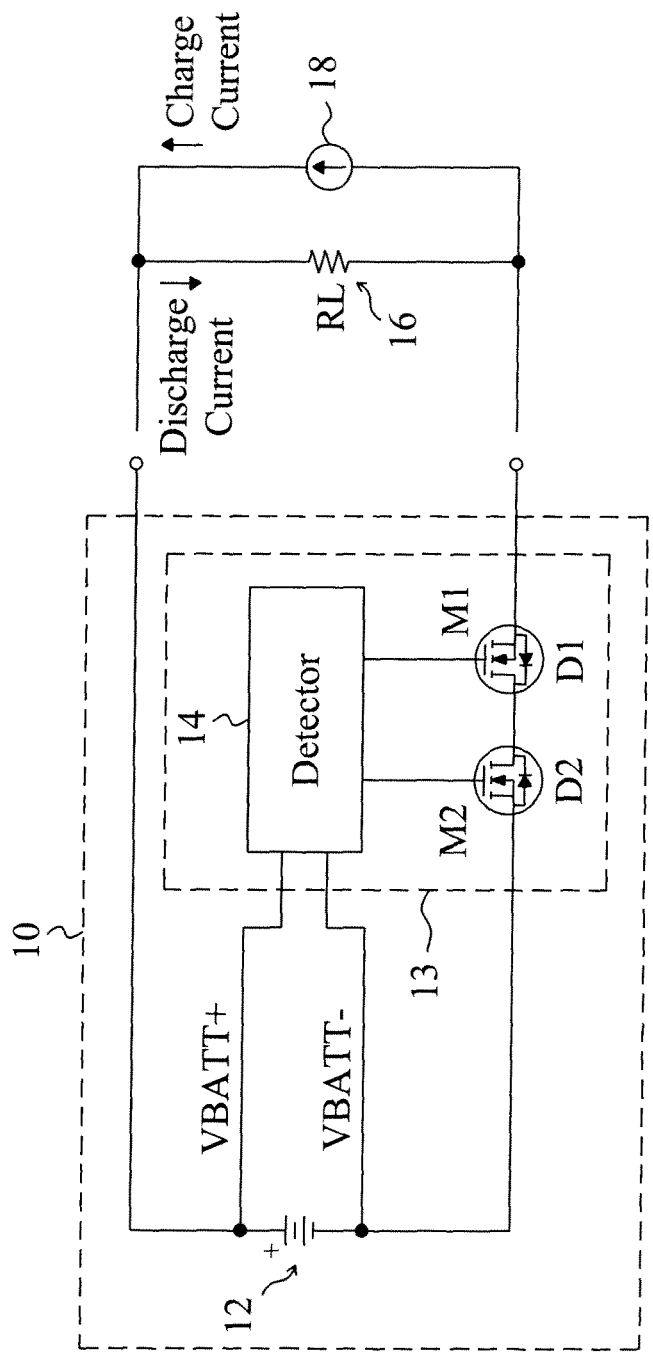
FIG. 1 shows a conventional battery package for portable electronic devices.
Figure 2:
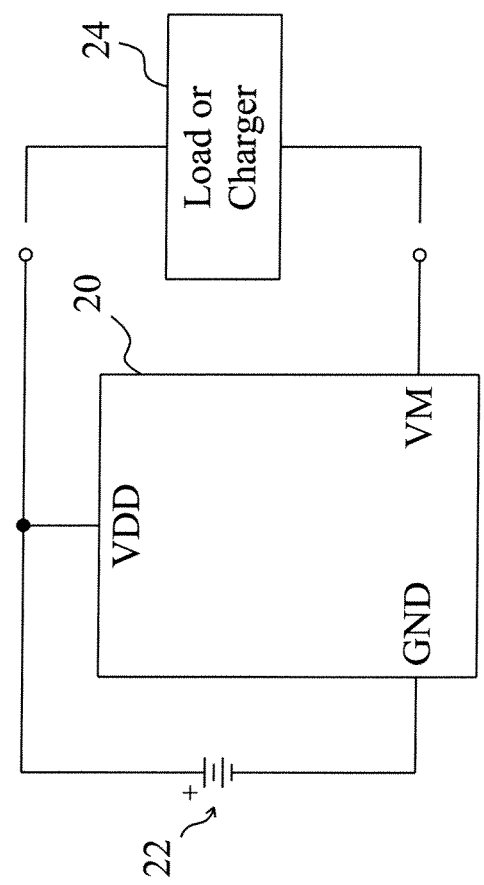
FIG. 2 shows a low-side switch embedded integrated circuit for battery protection according to the present invention.
Figure 3:
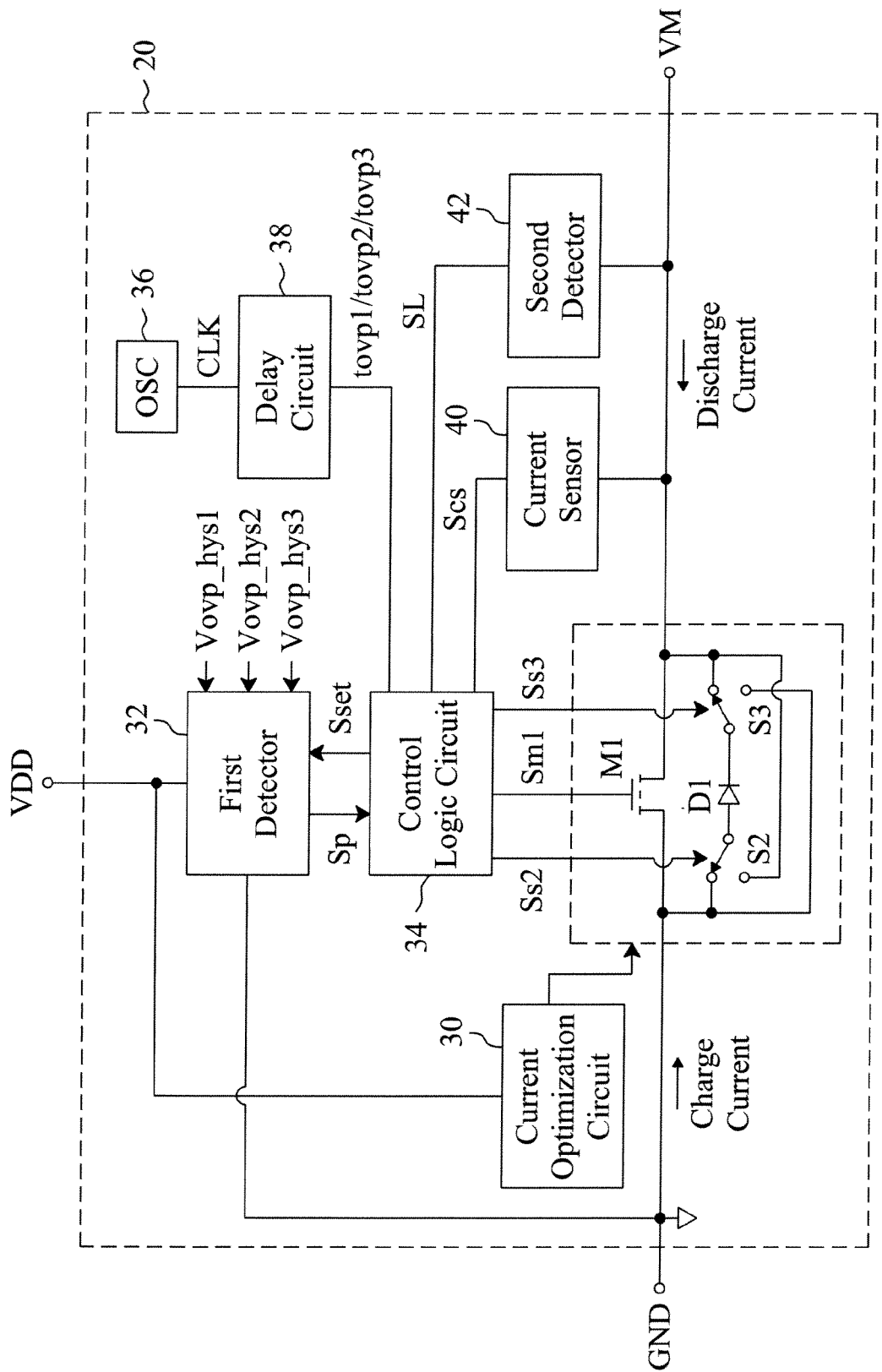
FIG. 3 shows an embodiment for the low-side switch embedded integrated circuit of FIG. 2.

According to the present invention, as shown in FIG. 2, a low-side switch embedded integrated circuit 20 for battery protection includes three pins VDD, GND, and VM. A battery 22 is coupled between the pins VDD and GND, and a load or a charger 24 is coupled between the pins VDD and VM. FIG. 3 shows an embodiment for the low-side switch embedded integrated circuit 20, in which a MOSFET M1 is coupled between the pins GND and VM and has a body diode D1, a switch S2 couples an anode of the body diode D1 to the pin GND or VM, and a switch S3 couples a cathode of the body diode D1 to the pin GND or VM. By switching the switches S2 and S3, the direction of the body diode D1 is changed. In addition, a current optimization circuit 30 is provided to prevent the MOSFET M1 from being latched up during its high-current operation, a first detector 32 is coupled to the pins VDD and GND for monitoring the voltage of the battery 22 to determine a detection signal Sp, a second detector 42 is coupled to the pin VM for monitoring the voltage on the pin VM to generate a detection signal SL for indicating that the pin VM is coupled to a charger or a load, or is floating, a current sensor 40 detects the charge or discharge current to generate a current sense signal Scs, a control logic circuit 34 controls the MOSFET M1 and the switches S2 and S3, an oscillator 36 provides a clock CLK, and according to the clock CLK, a delay circuit 38 provides delay times tovp1, tovp2 and tovp3 for the control logic circuit 34. Since only a MOSFET M1 is used to control the charging and discharging of the battery 22, both the costs and die area are reduced. In addition, all elements of the protection circuit are integrated into the same integrated circuit 20, thereby simplifying the circuitry on the printed circuit board, as shown in FIG. 2.

Referring to FIG. 3, in normal operation, the MOSFET M1 is fully on, so a charge current or a discharge current is allowed to enter into or exit from the battery 22 through the MOSFET M1. Once the first detector 32 detects an under-voltage event, it asserts the detection signal Sp to signal the control logic circuit 34 to turn off the MOSFET M1 and to couple the anode and the cathode of the body diode D1 to the pins GND and VM, respectively, in order to block any discharge current and only allow a charge current to pass through, thereby achieving under-voltage protection. Once the first detector 32 detects an over-voltage event, it asserts the detection signal Sp to signal the control logic circuit 34 to turn off the MOSFET M1 and to couple the anode and the cathode of the body diode D1 to the pins VM and GND, respectively, in order to block any charge current and only allow a discharge current to pass through, thereby achieving over-voltage protection.

Figure 4:
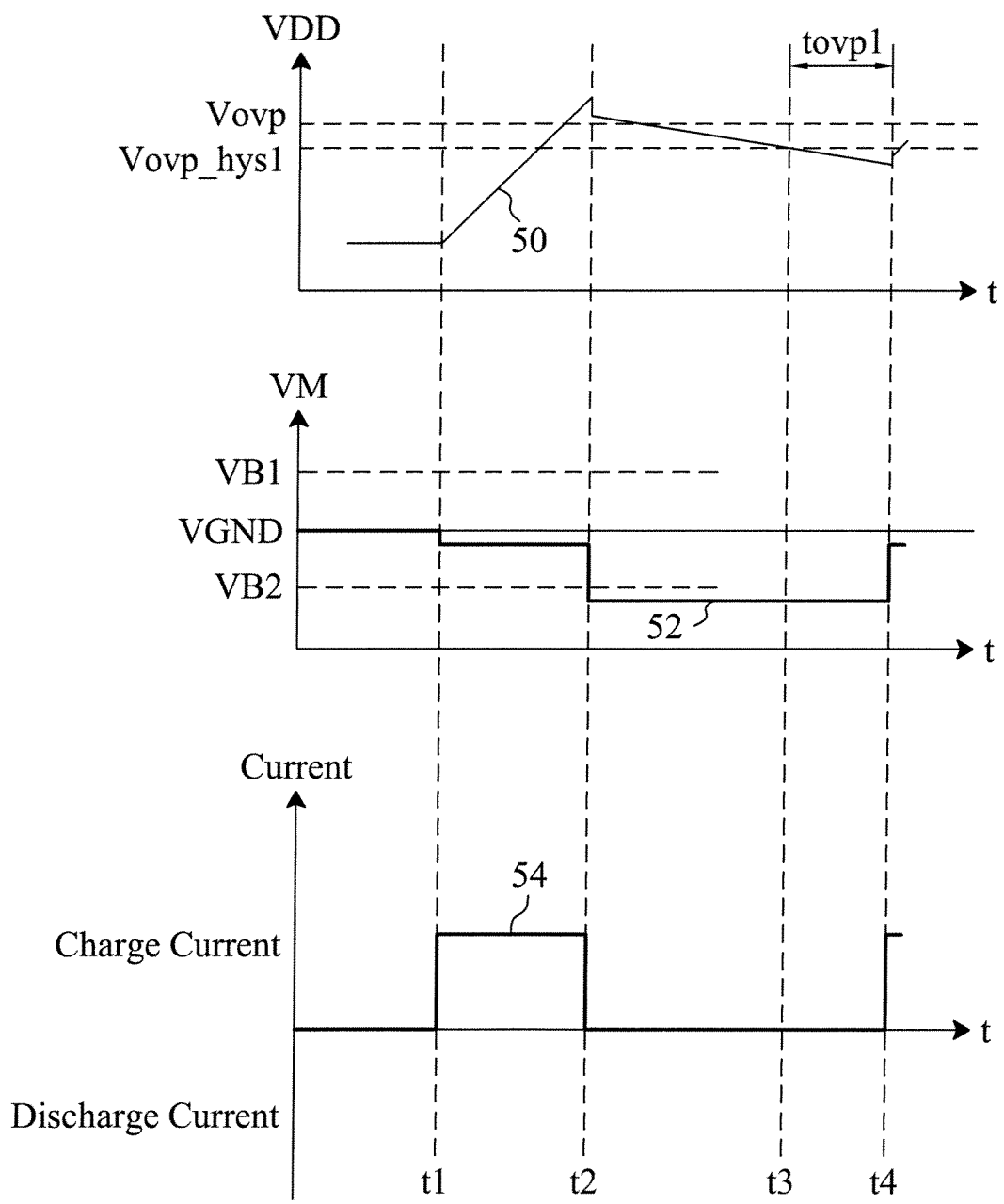
FIG. 4 illustrates an over-voltage-protection-release response of the switch embedded integrated circuit of FIG. 3 if, after an over-voltage event, the pin VM remains coupled with a charger.

After an over-voltage event, the switch embedded integrated circuit 20 will take one of different over-voltage-protection-release (OVPR) responses depending on the condition of the pin VM. For example, after an over-voltage event, if the pin VM remains coupled with a charger, the switch embedded integrated circuit 20 takes an OVPR response as shown in FIG. 4, in which waveform 50 represents the voltage of the battery 22, waveform 52 represents the voltage on the pin VM, and waveform 54 represents the current of the MOSFET M1. Referring to FIGS. 3 and 4, at time t1, the MOSFET M1 is turned on, and the charger provides a charge current to charge the battery 22, as shown by the waveform 54, so the voltage of the battery 22 increases, as shown by the waveform 50. Because of the on resistance of the MOSFET M1, there is a voltage drop across the MOSFET M1 when the charge current flows through the MOSFET M1, resulting a negative voltage on the pin VM, as shown by the waveform 52. When the voltage of the battery 22 becomes greater than an over-voltage-protection threshold Vovp for a period of time, the first detector 32 asserts the detection signal Sp to signal the control logic circuit 34 to turn off the MOSFET M1 and to couple the anode and the cathode of the body diode D1 to the pins VM and GND, respectively, in order to block the charge current, as shown at time t2. At this time, since the pin VM is coupled with a charger, the voltage on the pin VM will reduce, as shown by the waveform 52. For instance, assuming that the charger provides a voltage of 6V, the battery voltage is 4V, and the charger and the battery 22 are both coupled to the pin VDD, after the MOSFET M1 is turned off, the voltage on the pin VM becomes −2V. When the second detector 42 detects that the voltage on the pin VM is lower than a negative voltage VB2, the detection signal SL will inform the control logic circuit 34 of that the charger is still coupled to the pin VM, and as a result, the control logic circuit 34 will assert a setting signal Sset to the first detector 32 to select a voltage Vovp_hys1 as an OVPR threshold. After the MOSFET M1 is turned off, due to the self discharge of the battery 22, the voltage of the battery 22 descends gradually. At the time it is lower than the OVPR threshold Vovp_hys1, i.e. time t3, the first detector 32 turns off the detection signal Sp to make the control logic circuit 34 turn on the MOSFET M1. For preventing misoperation, the control logic circuit 34 does not turn on the MOSFET M1 until the detection signal Sp is off for a period longer than an OVPR delay time, i.e. time t4. At this time, the switch embedded integrated circuit 20 releases the over-voltage protection. In this embodiment, according to the detection signal SL the control logic circuit 34 selects the delay time tovp1 as the OVPR delay time. Since the charger is not removed, after the MOSFET M1 is turned on, the charger will charge the battery 22 again. When the voltage of the battery 22 becomes greater than the over-voltage-protection threshold Vovp once again, the foregoing operation is repeated.

Figure 5:
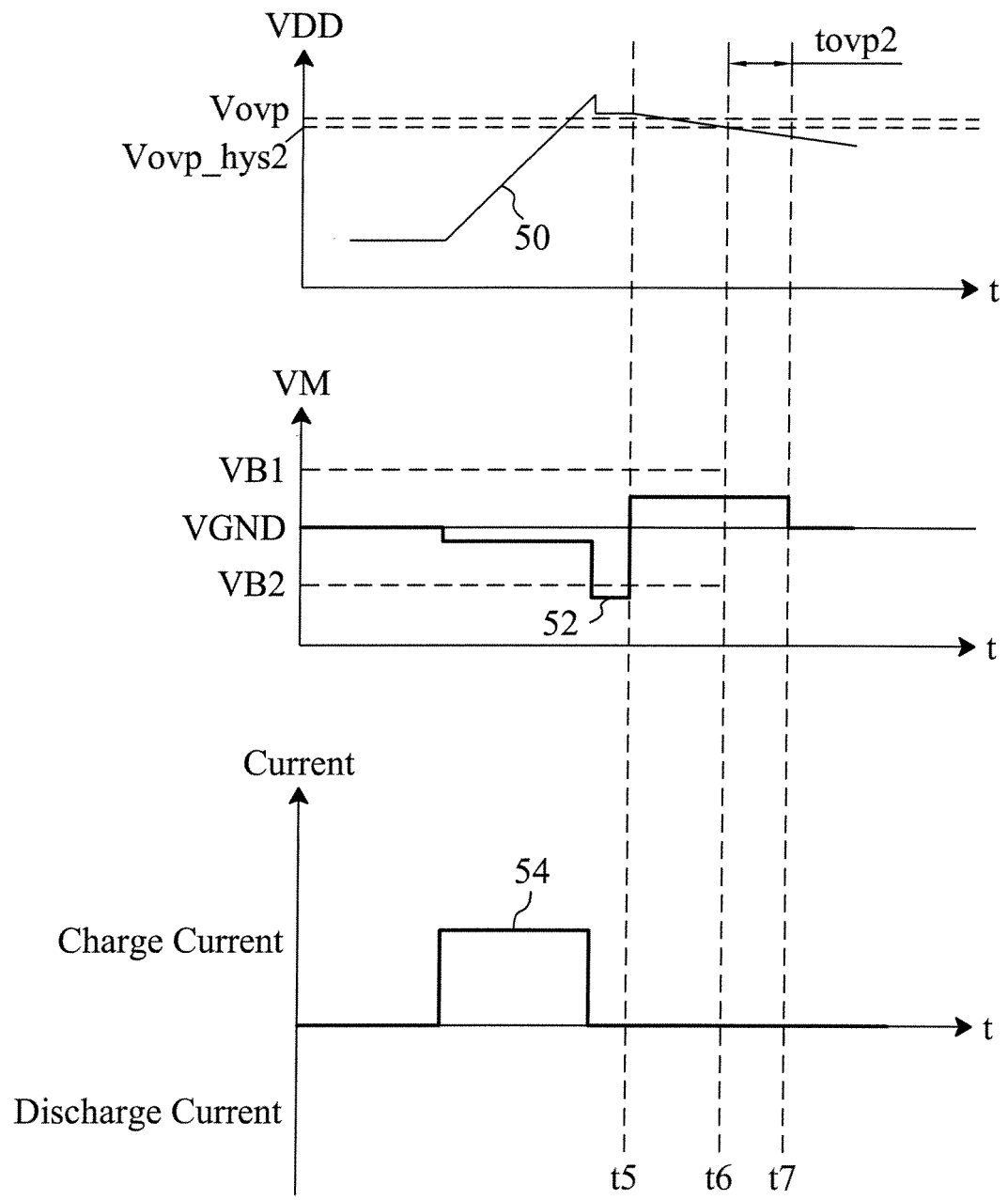
FIG. 5 illustrates an over-voltage-protection-release response of the switch embedded integrated circuit of FIG. 3 if, after an over-voltage event, the pin VM becomes floating.

After an over-voltage event, if the pin VM becomes floating, the switch embedded integrated circuit 20 will take the OVPR response as shown in FIG. 5. Referring to FIGS. 3 and 5, when the charger charges the battery 22 to the over-voltage-protection threshold Vovp, the control logic circuit 34 turns off the MOSFET M1 and couples the anode and the cathode of the body diode D1 to the pins VM and GND, respectively, in order to block the charge current. When the charger is removed at time t5, the pin VM becomes floating and at this time, the internal current of the switch embedded integrated circuit 20 may pass the pin VM, so the voltage on the pin VM has a positive value. If the second detector 42 detects that the voltage on the pin VM is lower than a positive voltage VB1 but greater than the negative voltage VB2, the detection signal SL will inform the control logic circuit 34 of that the charger has been removed, so the control logic circuit 34 selects the delay time tovp2 as the OVPR delay time and asserts a setting signal Sset to the first detector 32 to select a voltage Vovp_hys2 as the OVPR threshold. Due to the self discharge of the battery 22, the battery voltage descends gradually. When the battery voltage becomes lower than the OVPR threshold Vovp_hys2, at time t6, the first detector 32 turns off the detection signal Sp to make the control logic circuit 34 turn on the MOSFET M1 to release the over-voltage protection. For preventing misoperation, the control logic circuit 34 does not turn on the MOSFET M1 until the detection signal Sp is off for a period longer than an OVPR delay time tovp2, at time t7. At this time, the switch embedded integrated circuit 20 releases the over-voltage protection. After the MOSFET M1 is turned on, the pins GND and VM are short to each other, so the voltage on the pin VM is equal to that of the pin GND, while the battery 22 continues its self discharge that leads to continuously decrease of the battery voltage.

Figure 6:
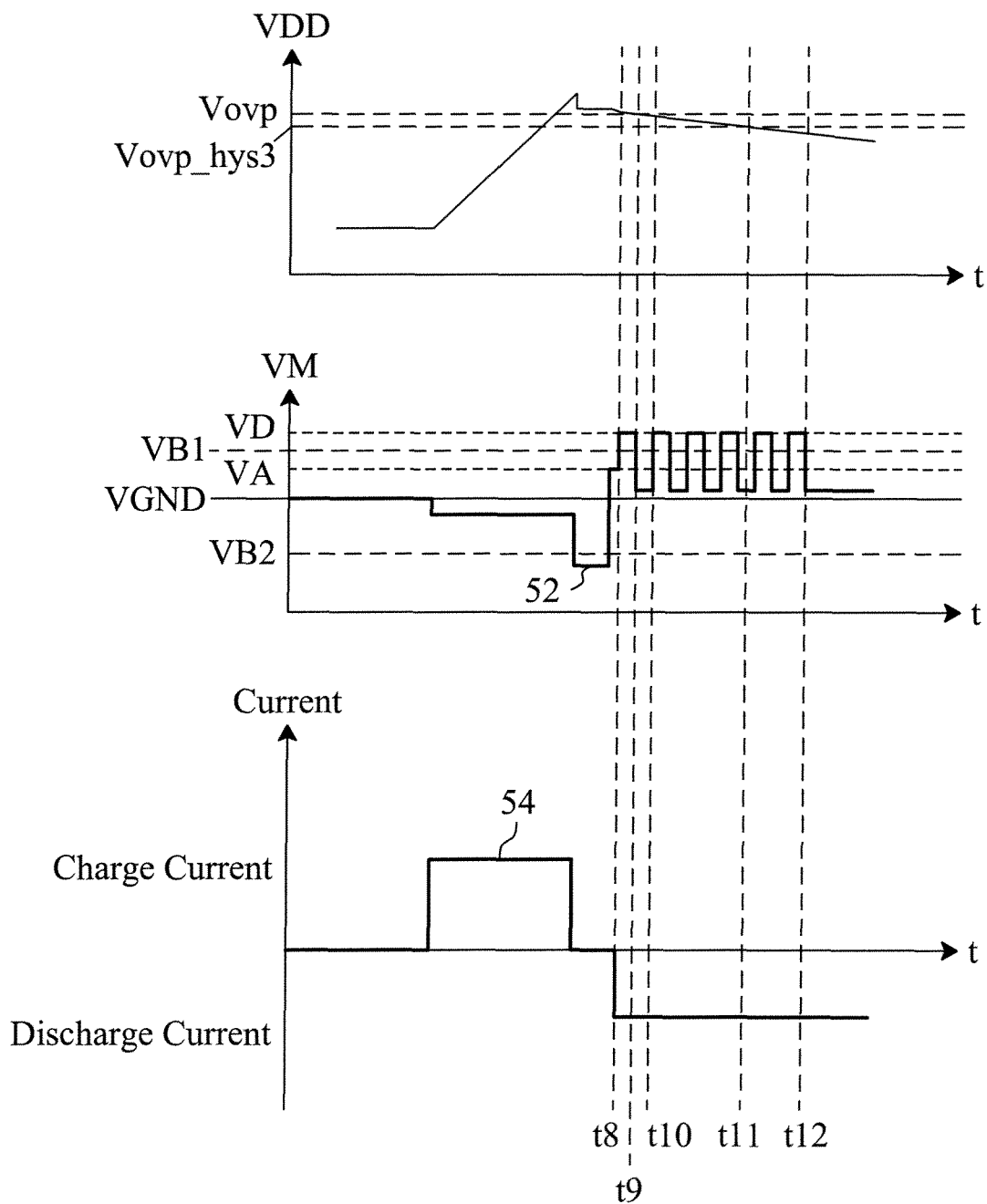
FIG. 6 illustrates an over-voltage-protection-release response of the switch embedded integrated circuit of FIG. 3 if, after an over-voltage event, the charger is removed therefrom and a load is coupled thereto.

After an over-voltage event, if the charger is removed and a load is coupled, the switch embedded integrated circuit 20 will take the OVPR response as shown in FIG. 6. Referring to FIGS. 3 and 6, when the charger charges the battery 22 to the over-voltage-protection threshold Vovp, the control logic circuit 34 turns off the MOSFET M1 and couples the anode and the cathode of the body diode D1 to the pins VM and GND, respectively, in order to block the charge current. After the MOSFET M1 is turned off, the voltage of the battery 22 decreases as a result of its self discharge. After the charger is removed and the load is coupled, i.e. at time t8, the battery 22 provides a discharge current that flows through the body diode D1 of the MOSFET M1 and produces a forward voltage VD between the anode and the cathode of the body diode D1. The current sensor 40 detects the discharge current and generates a current sense signal Scs accordingly for the control logic circuit 34 to turn on the MOSFET M1, at time t9. At this time, the discharge current does not pass the body diode D1 but passes the MOSFET M1 instead, thereby reducing unnecessary power dissipation and heat generated. However, since the switch embedded integrated circuit 20 is still under the over-voltage protection, after the MOSFET M1 is conductive for a time period ton, the control logic circuit 34 will turn off the MOSFET M1 again in response to the detection signal Sp, as shown at time t10. After the MOSFET M1 is turned off for a time period toff, the control logic circuit 34 turns on the MOSFET M1 again in response to the current sense signal Scs. In other words, during the over-voltage protection, the control logic circuit 34 switches the MOSFET M1 repeatedly according to the detection signal Sp and the current sense signal Scs. Thus, during the over-voltage protection, the average VA of the voltage drop across the body diode D1 is smaller than the forward voltage VD, so the power loss and heat generated caused by the body diode D1 can be reduced. When the switch embedded integrated circuit 20 is coupled with a load, i.e. at time t8, the second detector 42 detects that the voltage on the pin VM is greater than the threshold VB1 and thus asserts the detection signal SL to inform the control logic circuit 34 that a load is coupled. Therefore, the control logic circuit 34 selects the delay time tovp3 as the OVPR delay time, and asserts a setting signal Sset to the first detector 32 to select a voltage Vovp_hys3 as the OVPR threshold. When the voltage of the battery 22 is lower than the OVPR threshold Vovp_hys3, i.e. at time t11, the first detector 32 turns off the detection signal Sp to make the control logic circuit 34 turn on the MOSFET M1. For preventing misoperation, the control logic circuit 34 does not turn on the MOSFET M1 until the OVPR delay time tovp3 is over without receiving the detection signal Sp, at time t12. At this time, the switch embedded integrated circuit 20 release the over-voltage protection and returns to normal operation.

In FIGS. 4-6, the OVPR threshold Vovp_hys1 is smaller than either Vovp_hys2 or Vovp_hys3, Vovp_hys2 may be equal to or unequal to the OVPR threshold Vovp_hys3, and Vovp_hys2 and Vovp_hys3 may be equal to the over-voltage-protection threshold Vovp. The OVPR delay time tovp1 is not equal to either tovp2 or tovp3, and tovp2 may be equal to or unequal to the OVPR delay time tovp3.

Figure 7:
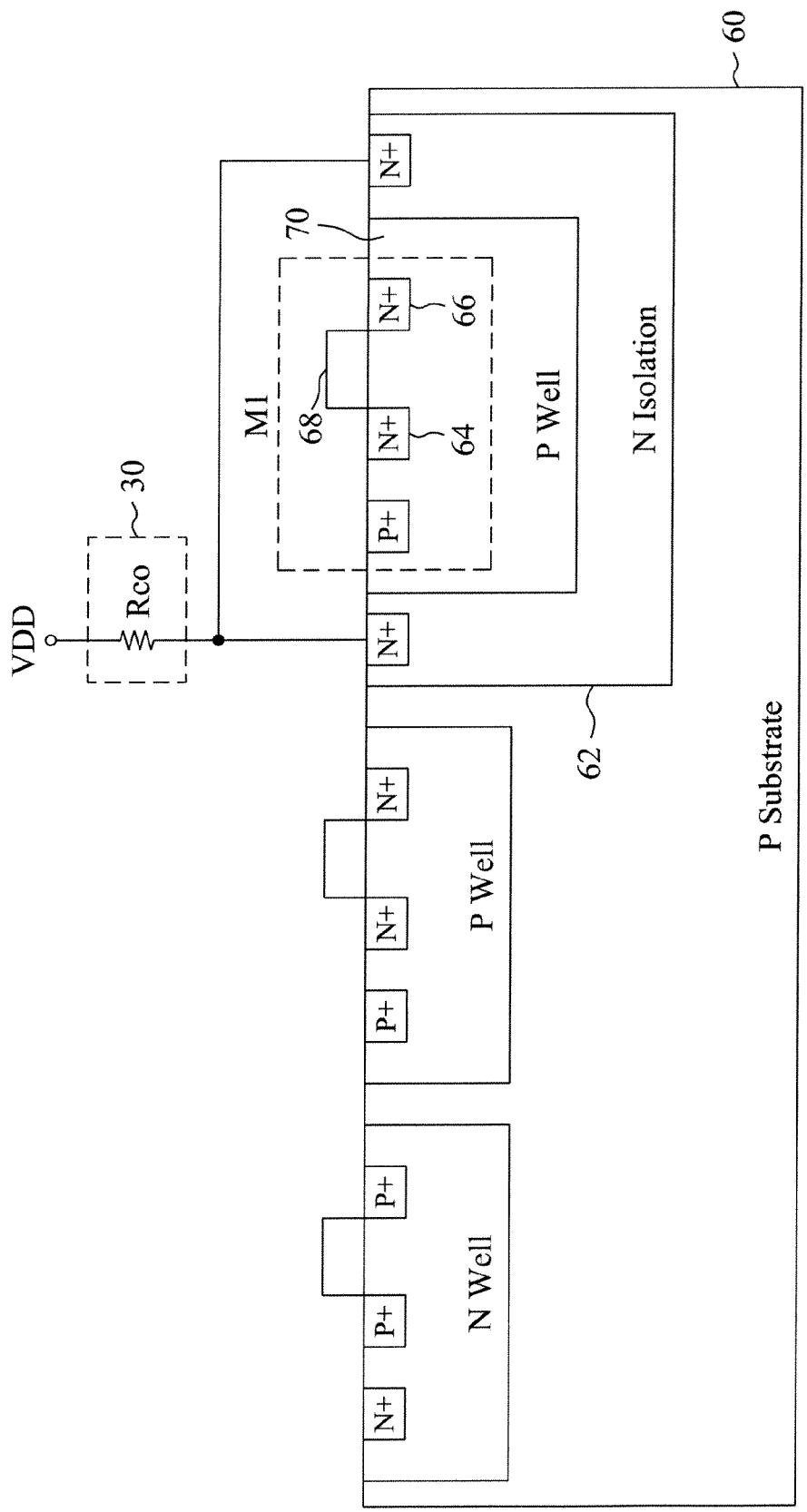
FIG. 7 is a cross-sectional view of the switch embedded integrated circuit of FIG. 3 with a circuit diagram of an embodiment for the current optimization circuit of FIG. 3.

FIG. 7 is a cross-sectional view of the switch embedded integrated circuit 20 with a circuit diagram of an embodiment for the current optimization circuit 30, in which the MOSFET M1 includes a P well 70 as the substrate, N regions 64 and 66 as a drain and a source, and an electric conductor 68 as a gate above and between the N regions 64 and 66. Since the MOSFET M1 and the other elements of the protection circuit are integrated in a same integrated circuit, all of them are on a same chip 60, with an isolation 62 to isolate the MOSFET M1 from the other elements, so as to facilitating switching the direction of the body diode D1 of the MOSFET M1. When the MOSFET M1 is under high-current operation, latch up may happen and make the current flow toward the isolation 62 from the N regions 64 and 66 through the P well 70. In this embodiment, the current optimization circuit 30 has a resistor Rco coupled between the pin VDD and the isolation 62, so as to apply a voltage to the isolation 62, thereby preventing the latch up.

Figure 8:
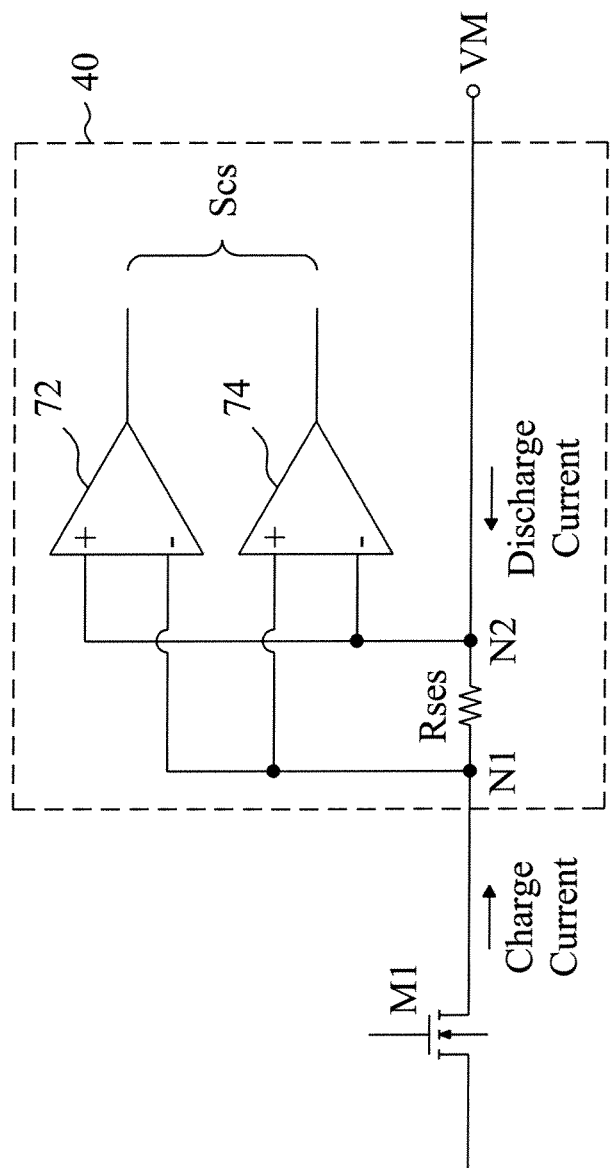
FIG. 8 is a circuit diagram of an embodiment for the current sensor of FIG. 3.

FIG. 8 is a circuit diagram of an embodiment for the current sensor 40, which includes a current sense resistor Rses serially coupled to the MOSFET M1, a discharge comparator 72 having a positive input and a negative input coupled to two terminals N2 and N1 of the current sense resistor Rses, respectively, and a charge comparator 74 having a positive input and a negative input coupled to the two terminals N1 and N2 of the current sense resistor Rses, respectively. When the discharge current flows through the current sense resistor Rses, the voltage at the terminal N2 is greater than that at the terminal N1, so the discharge comparator 72 has a high-level output, which informs the control logic circuit 34 that the discharge current is flowing through the MOSFET M1. When the charge current flows through the current sense resistor Rses, the voltage at the terminal N1 is greater than that at the terminal N2, so the charge comparator 74 has a high-level output, which informs the control logic circuit 34 that the charge current is flowing through the MOSFET M1.

Figure 9:
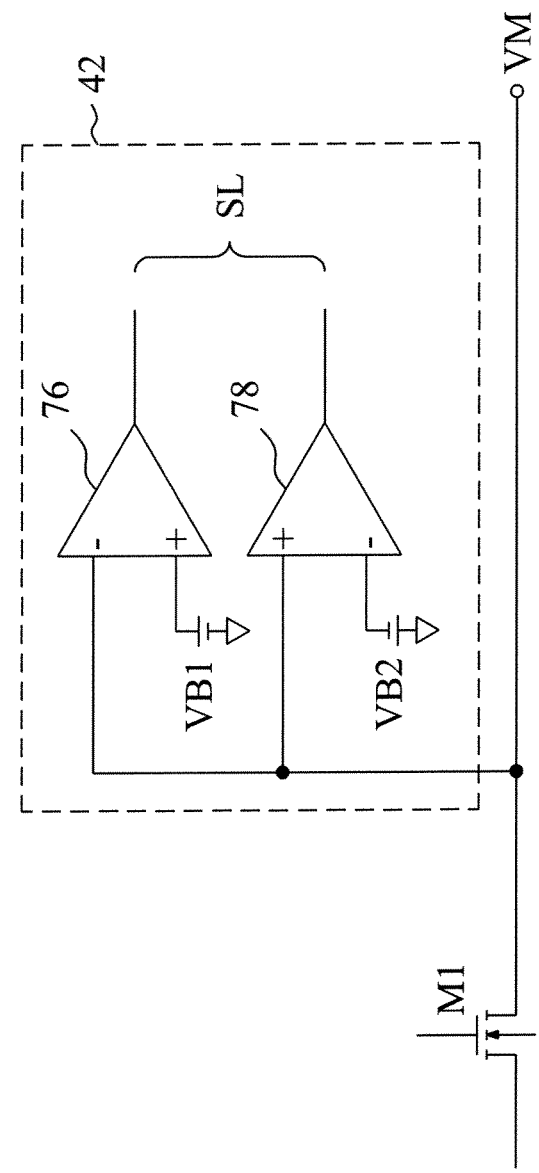
FIG. 9 is a circuit diagram of an embodiment for the second detector of FIG. 3.
Figure 10:
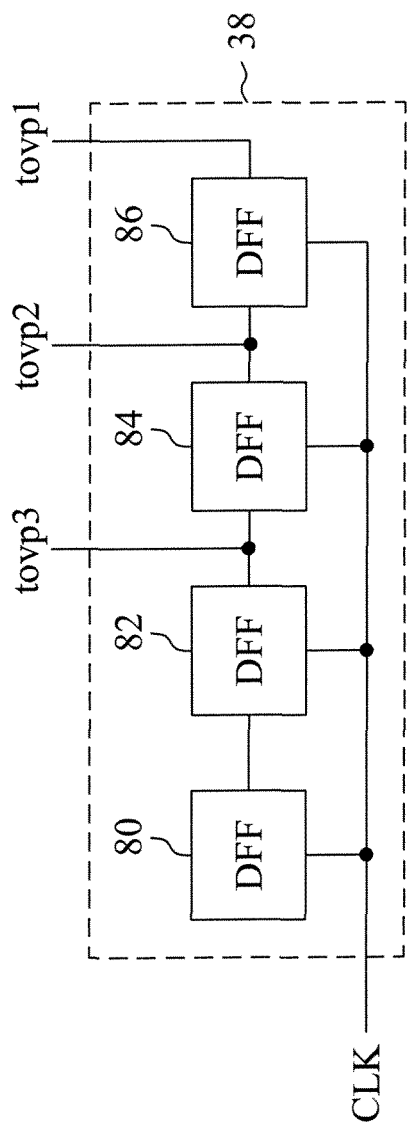
FIG. 10 is a circuit diagram of an embodiment for the delay circuit of FIG. 3.

FIG. 9 is a circuit diagram of an embodiment for the second detector 42, which includes a comparator 76 having a positive input receiving the positive voltage VB1 and a negative input coupled to the pin VM, and a comparator 78 having a positive input coupled to the pin VM and a negative input receiving the negative voltage VB2. When the voltage on the pin VM is lower than the negative voltage VB2, the comparator 76 has a high-level output and the comparator 78 has a low-level output, which inform the control logic circuit 34 that a charger is coupled to the pin VM. When the voltage on the pin VM is higher than the negative voltage VB2 but lower than the positive voltage VB1, the comparators 76 and 78 both have high-level outputs, which inform the control logic circuit 34 that the pin VM is floating. When the voltage on the pin VM is higher than the positive voltage VB1, the comparator 76 has a low-level output and the comparator 78 has a high-level output, which inform the control logic circuit 34 that a load is coupled to the pin VM. FIG. 10 is a circuit diagram of an embodiment for the delay circuit 38, which includes a string of D-type flip-flops 80, 82, 84 and 86 coupled together in series, for generating the delay times tovp1, tovp2 and tovp3 according to the clock CLK.

Figure 11:
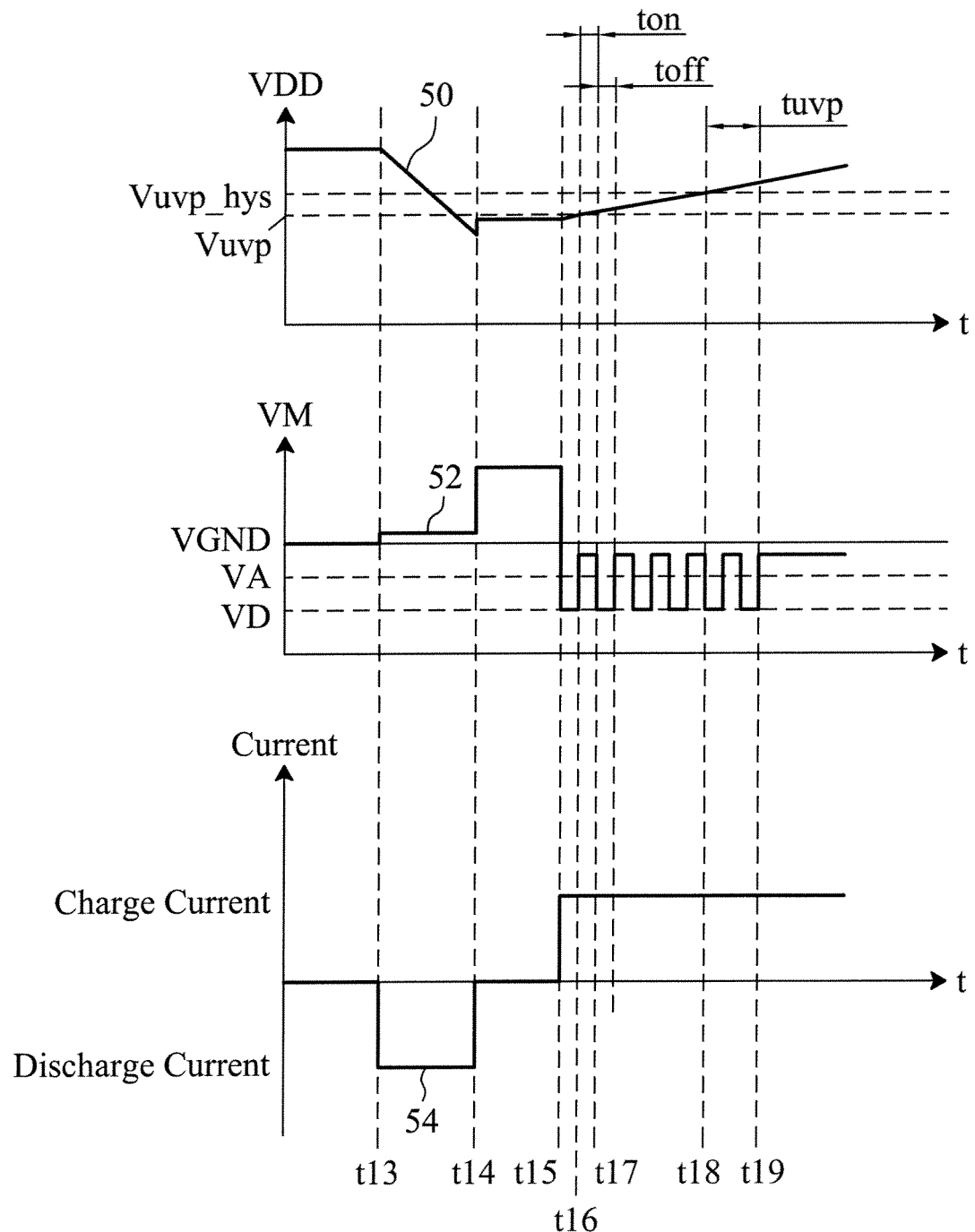
FIG. 11 illustrates an under-voltage-protection-release response of the switch embedded integrated circuit of FIG. 3.

FIG. 11 illustrates an under-voltage-protection-release (UVPR) response of the switch embedded integrated circuit of FIG. 3. Referring to FIGS. 3 and 11, at time t13, the switch embedded integrated circuit 20 is coupled with a load and the MOSFET M1 is turned on, so a battery 22 provides a discharge current to the load, as shown by the waveform 54. As a result, the voltage of the battery 22 decreases, as shown by the waveform 50. Due to the on resistance of the MOSFET M1, there is a voltage drop across the MOSFET M1 when the discharge current flows through the MOSFET M1, so the voltage on the pin VM has a positive value, as shown by the waveform 52. When the voltage of the battery 22 becomes lower than an under-voltage protection threshold Vuvp for a period of time, the first detector 32 asserts the detection signal Sp to signal the control logic circuit 34 to turn off the MOSFET M1 and to couple the anode and the cathode of the body diode D1 to the pins GND and VM, respectively, in order to block the discharge current, as shown at time t14. At this time, the voltage on the pin VM increases. When the load is removed and a charger is coupled, e.g. at time t15, the charger provides a charge current to charge the battery 22, so the voltage of the battery 22 starts to increase; while the charge current passes the body diode D1 of the MOSFET M1, so there is a forward voltage VD between the anode and the cathode of the body diode D1. Then the current sensor 40 detects the charge current and asserts the current sense signal Scs accordingly for the control logic circuit 34 to turn on the MOSFET M1, at time t16. At this time, the charge current does not pass the body diode D1 but passes the MOSFET M1 instead, thereby preventing reducing power loss and heat generated. However, since the switch embedded integrated circuit 20 is still under the under-voltage protection, after the MOSFET M1 is turned on for a time period ton, the control logic circuit 34 turns off the MOSFET M1 again in response to the detection signal Sp, as shown at time t17. After the MOSFET M1 is turned off for a time period toff, the control logic circuit 34 turns on the MOSFET M1 again in response to the current sense signal Scs. In other words, during the under-voltage protection, the control logic circuit 34 switches the MOSFET M1 repeatedly according to the detection signal Sp and the current sense signal Scs. Thus, during the under-voltage protection, the average VA of the voltage drop across the body diode D1 is smaller than the forward voltage VD, so the power loss and heat generated caused by the body diode D1 can be reduced. When the voltage of the battery 22 becomes higher than an UVPR threshold Vuvp_hys, e.g. at time t18, the first detector 32 turns off the detection signal Sp so as to make the control logic circuit 34 turn on the MOSFET M1. For preventing misoperation, the control logic circuit 34 does not turn on the MOSFET M1 until an UVPR delay time tuvp is over without receiving the detection signal Sp, at time t19. At this time, the switch embedded integrated circuit 20 releases the under-voltage protection.

Figure 12:
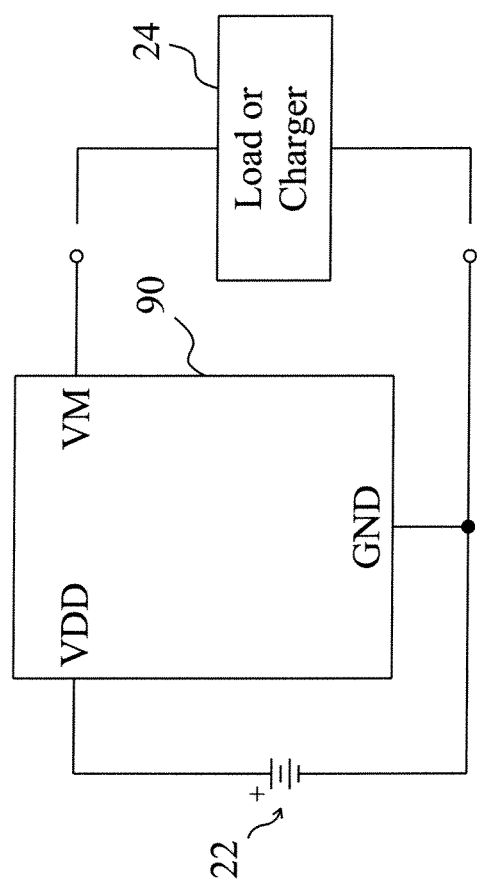
FIG. 12 shows a high-side switch embedded integrated circuit for battery protection according to the present invention.
Figure 13:
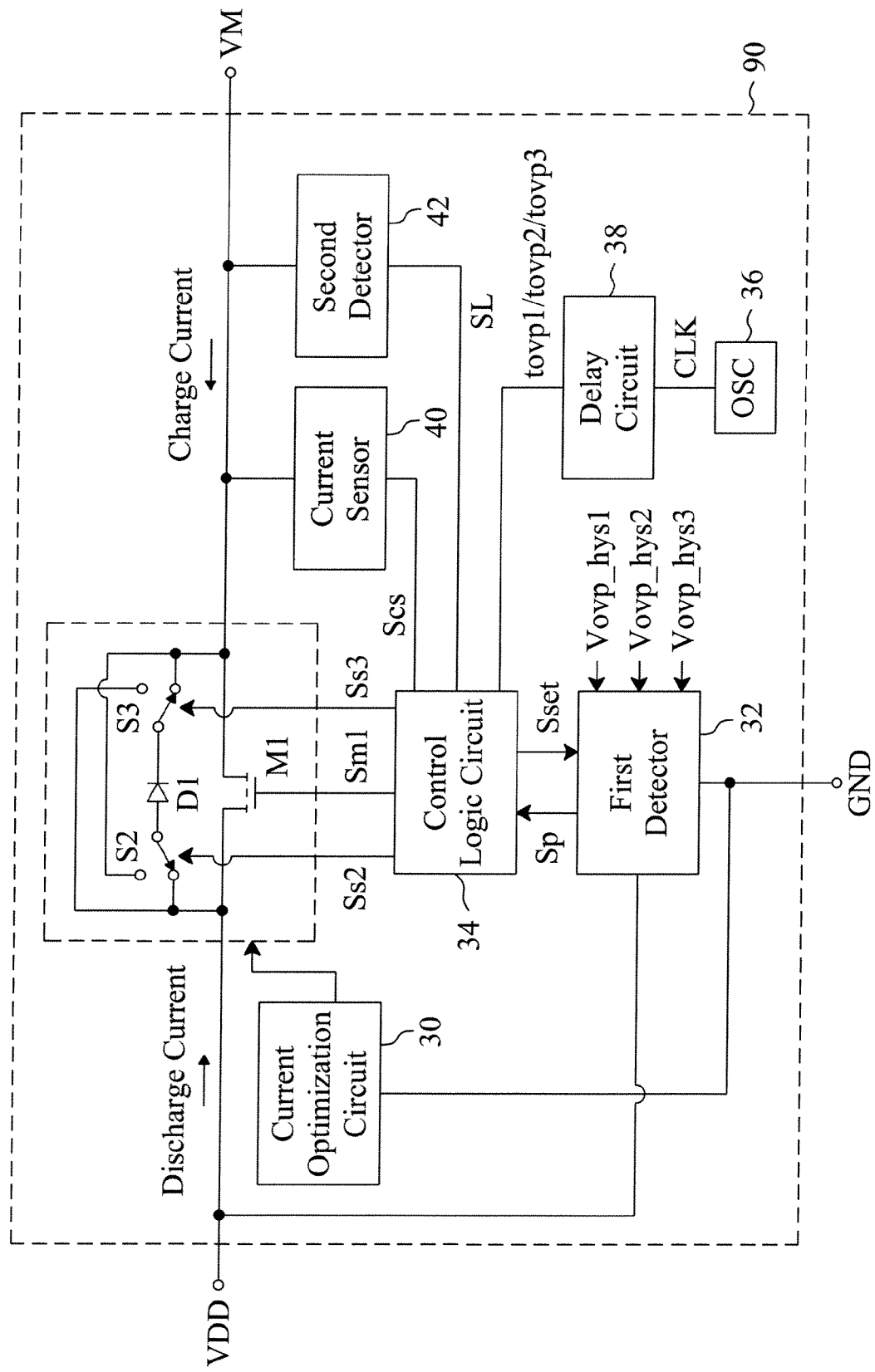
FIG. 13 shows an embodiment for the high-side switch embedded integrated circuit of FIG. 12.

FIG. 12 is a high-side switch embedded integrated circuit 90 for battery protection, which includes three pins VDD, GND and VM. A battery 22 is coupled between the pins VDD and GND, and a load or charger 24 is coupled between the pins VM and GND. FIG. 13 shows an embodiment for the high-side switch embedded integrated circuit 90. In addition to the first detector 32, the control logic circuit 34, the oscillator 36, the delay circuit 38, the current sensor 40 and the second detector 42 as shown in FIG. 3, this embodiment further has a MOSFET M1 coupled between the pins VDD and VM and a current optimization circuit 30 coupled between the pin GND and the isolation 62. Since only a MOSFET M1 is used to control the charging and discharging of the battery 22, both the costs and die area are reduced. In addition, all elements of the protection circuit are integrated into the same integrated circuit 30, thereby simplifying the circuitry on the printed circuit board, as shown in FIG. 12.

Referring to FIG. 13, in normal operation, the MOSFET M1 is fully on, so a charge current or a discharge current is allowed to enter into or exit from the battery 22 through the MOSFET M1. Once the first detector 32 detects an over-voltage event, it asserts the detection signal Sp to signal the control logic circuit 34 to turn off the MOSFET M1 and to couple the anode and the cathode of the body diode D1 to the pins VDD and VM, respectively, in order to block any charge current and only allow a discharge current to pass through, thereby achieving over-voltage protection. Once the first detector 32 detects an under-voltage event, it asserts the detection signal Sp to signal the control logic circuit 34 to turn off the MOSFET M1 and to couple the anode and the cathode of the body diode D1 to the pins VM and VDD, respectively, in order to block any discharge current and only allow a charge current to pass through, thereby achieving under-voltage protection.

After an over-voltage event, the switch embedded integrated circuit 90 takes one of different OVPR responses depending on the condition of the pin VM, as does the circuit of FIG. 3. Similarly, the switch embedded integrated circuit 90 takes its UVPR responses as does the circuit of FIG. 3.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A switch embedded integrated circuit for battery protection, comprising:
   first, second and third pins;
   a MOSFET coupled between the first and second pins, the MOSFET having a body diode;
   a first switch coupled to an anode of the body diode and controlled to couple the anode of the body diode to the first pin or the second pin;
   a second switch coupled to a cathode of the body diode and controlled to couple the cathode of the body diode to the first pin or the second pin;
   a control logic circuit coupled to the MOSFET, the first switch and the second switch, operative to control the MOSFET, the first switch and the second switch according to a first detection signal;
   a first detector coupled to the control logic circuit, the first pin and the third pin, operative to monitor a voltage between the first pin and the third pin to determine the first detection signal;
   a second detector coupled to the second pin, operative to detect a voltage on the second pin to determine a second detection signal for the control logic circuit to select an over-voltage-protection-release (OVPR) threshold and an over-voltage-protection-release (OVPR) delay time;
   a current sensor coupled to the control logic circuit and the second pin, operative to generate a current sense signal when detecting a discharge current or a charge current for the control logic circuit to turn on the MOSFET,
   wherein the current sensor comprises:
   a current sense resistor coupled in series to the MOSFET;
   a discharge comparator having a positive input and a negative input coupled to a first terminal and a second terminal of the current sense resistor, respectively, operative to assert the current sense signal responsive to detecting the discharge current flowing through the current sense resistor; and
   a charge comparator having a positive input and a negative input coupled to the first terminal and the second terminal of the current sense resistor, respectively, operative to assert the current sense signal responsive to detecting the charge current flowing through the current sense resistor.

2. The switch embedded integrated circuit of claim 1, wherein the control logic circuit selects the OVPR delay time according to the second detection signal, and generates a setting signal for the first detector to determine the OVPR threshold.

3. The switch embedded integrated circuit of claim 1, wherein the second detector comprises:
   a first comparator having a positive input to receive a positive voltage and a negative input coupled to the second pin; and
   a second comparator having a positive input coupled to the second pin and a negative input to receive a negative voltage;
   wherein the second detection signal is determined by outputs of the first and second comparators.

4. The switch embedded integrated circuit of claim 1, further comprising:
   an oscillator providing a clock; and a delay circuit coupled to the oscillator and the control logic circuit, operative to provide a plurality of OVPR delay times according to the clock for the control logic circuit.

5. The switch embedded integrated circuit of claim 4, wherein the delay circuit comprises a string of flip-flops coupled in series.

6. The switch embedded integrated circuit of claim 1, further comprising an isolation for isolating the MOSFET.

7. The switch embedded integrated circuit of claim 6, further comprising a current optimization circuit coupled to the isolation, operative to apply a voltage to the isolation for preventing the MOSFET from being latched up.

8. The switch embedded integrated circuit of claim 7, wherein the current optimization circuit comprises a resistor coupled between the third pin and the isolation.

9. The switch embedded integrated circuit of claim 1, wherein the first detector responsive to an over-voltage event to assert the first detection signal to make the control logic circuit turn off the MOSFET and switch the first and second switches, to make the body diode block a charge current and allow a discharge current to pass.

10. The switch embedded integrated circuit of claim 9, wherein the anode and the cathode of the body diode are coupled to the second pin and the first pin, respectively.

11. The switch embedded integrated circuit of claim 9, wherein the anode and the cathode of the body diode are coupled to the first pin and the second pin, respectively.

12. The switch embedded integrated circuit of claim 1, wherein the first detector responsive to an under-voltage event to assert the first detection signal to make the control logic circuit turn off the MOSFET and switch the first and second switches, to make the body diode block a discharge current and allow a charge current to pass.

13. The switch embedded integrated circuit of claim 12, wherein the anode and the cathode of the body diode are coupled to the first pin and the second pin, respectively.

14. The switch embedded integrated circuit of claim 12, wherein the anode and the cathode of the body diode are coupled to the second pin and the first pin, respectively.

* * * * *